United States Patent
Nishio et al.

(10) Patent No.: US 7,648,212 B2
(45) Date of Patent: Jan. 19, 2010

(54) VEHICLE MOTION CONTROL APPARATUS

(75) Inventors: Akitaka Nishio, Anjo (JP); Tatsuya Yano, Toyoake (JP); Seiichi Kojima, Aichi-ken (JP); Kiyohito Takeuchi, Nagoya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 648 days.

(21) Appl. No.: 11/434,221

(22) Filed: May 16, 2006

(65) Prior Publication Data

US 2006/0267401 A1 Nov. 30, 2006

(30) Foreign Application Priority Data

May 17, 2005 (JP) ............................. 2005-144317
Mar. 10, 2006 (JP) ............................. 2006-065092

(51) Int. Cl.
*B60T 13/18* (2006.01)

(52) U.S. Cl. ................. 303/11; 303/113.3; 303/146; 303/166

(58) Field of Classification Search ............... 303/11, 303/10, 146, 147, 157, 158, 166, 167, 113.3, 303/115.4, 116.1
See application file for complete search history.

(56) References Cited

U.S. PATENT DOCUMENTS 5,791,745 A * 8/1998 Sakakibara ................. 303/11
5,882,089 A * 3/1999 Nakamura et al. ........... 303/10
6,481,806 B1 * 11/2002 Krueger et al. ............. 303/140
7,162,350 B2 * 1/2007 Kato et al. .................. 701/70

FOREIGN PATENT DOCUMENTS

EP 1 535 815 A1 6/2005
JP 2002-2517 A * 1/2002
JP 2004-66941 A 3/2004

* cited by examiner

*Primary Examiner*—Pam Rodriguez
(74) *Attorney, Agent, or Firm*—Buchanan Ingersoll & Rooney PC

(57) ABSTRACT

This apparatus is applied to a vehicle brake apparatus provided with a hydraulic booster operated by utilizing an accumulator hydraulic pressure that is adjusted to a predetermined high pressure (not less than a lower limit value) by a drive control of a hydraulic pump. This apparatus executes an automatic pressurization control by controlling plural solenoid valves with the use of the accumulator hydraulic pressure. The increasing slope of the brake hydraulic pressure during the automatic pressurization control is determined on the basis of the vehicle motion state. The increasing slope is restricted to be not more than a predetermined restriction value, in the case where the accumulator hydraulic pressure at the time of starting the automatic pressurization control is less than "a reference hydraulic pressure that is greater than a minimum value of the accumulator hydraulic pressure necessary for assisting the brake operation by the hydraulic booster and smaller than the lower limit value".

7 Claims, 7 Drawing Sheets

VEHICLE MOTION CONTROL APPARATUS

BACKGROUND OF THE INVENTION

1. Field of the Invention

The present invention relates to a vehicle motion control apparatus that performs an automatic pressurization control for generating a wheel cylinder hydraulic pressure in order to control a vehicle motion independently of a brake operation by a driver by utilizing an accumulator hydraulic pressure.

2. Description of the Related Art

Conventionally, there has been widely known a brake apparatus provided with a hydraulic pump, a motor for driving the hydraulic pump, an accumulator that stores brake fluid whose pressure is increased by the drive of the hydraulic pump by the motor, and a hydraulic booster that assists the brake pedal operation by a driver by utilizing the pressure of the brake fluid stored in the accumulator (hereinafter referred to as "accumulator hydraulic pressure") (see, for example, Japanese Unexamined Patent Application No. 2004-066941).

The apparatus disclosed in the aforesaid reference is configured to drive the motor (accordingly, hydraulic pump) when the accumulator hydraulic pressure becomes less than a predetermined lower limit value, and to stop the hydraulic pump when the accumulator hydraulic pressure exceeds a predetermined upper limit value that is greater than the lower limit value. Accordingly, the accumulator hydraulic pressure is adjusted in principle to "the pressure (high pressure) within the range between the lower limit value and the upper limit value" that is greater than a lower limit value of the accumulator hydraulic pressure (hereinafter referred to as "assist limit value") necessary for sufficiently assisting the brake pedal operation by the hydraulic booster.

Further, the apparatus disclosed in the aforesaid reference is provided with plural solenoid valves for adjusting the brake hydraulic pressure in the wheel cylinder (hereinafter referred to as "wheel cylinder hydraulic pressure"). With this structure, the apparatus disclosed in the aforesaid reference can execute a known anti-skid control (hereinafter referred to as "ABS control") by controlling the plural solenoid valves, and additionally, can execute an automatic pressurization control (e.g., an over-steer suppression control, or the like) that generates a wheel cylinder hydraulic pressure for controlling the vehicle motion independently of the brake operation by a driver by controlling the plural solenoid valves with the use of the accumulator hydraulic pressure adjusted to the high pressure.

Meanwhile, in case where the ABS control is executed, or in case where the operation in which the ON-OFF operation of the brake pedal is repeatedly performed (hereinafter referred to as "pumping brake operation") is executed, for example, the brake fluid in the brake hydraulic circuit is returned to the reservoir. Accordingly, the accumulator hydraulic pressure maintained to be the high pressure is in most cases reduced to become less than the lower limit value. In this case, the hydraulic pump is started to be driven, so that, in general, the accumulator hydraulic pressure immediately increases after that and is returned to be the value not less than the lower limit value.

However, in case where the degree of the increase or decrease in the wheel cylinder hydraulic pressure in the ABS control is extremely great and its cycle is short, or in case where the cycle of ON-OFF of the brake operation in the pumping brake operation is extremely short, the average speed of the brake fluid in the brake hydraulic circuit returned to the reservoir (hereinafter referred to as "consumption speed of brake fluid") becomes extremely fast. When the consumption speed of the brake fluid is extremely fast as described above, the accumulator hydraulic pressure still reduces even if the hydraulic pump is continuously driven, and as a result, there may occur the phenomena in which the accumulator hydraulic pressure reduces to the value near the assist limit value.

When the automatic pressurization control is started with the accumulator hydraulic pressure reduced to the value near the assist limit value, there may be the case where the accumulator hydraulic pressure still reduces even if the hydraulic pump is continuously driven, since the brake fluid is supplied to the wheel cylinder in order to increase the wheel cylinder hydraulic pressure. As a result, the accumulator hydraulic pressure can be less than the assist limit value.

SUMMARY OF THE INVENTION

The present invention is accomplished in view of the above-mentioned problem, and aims to provide a vehicle motion control apparatus that can stably secure the deceleration aimed by a driver for a brake pedal operation even if an automatic pressurization control is executed.

A first vehicle motion control apparatus according to the present invention is applied to a vehicle brake apparatus provided with a hydraulic pump; drive control means for driving the hydraulic pump; an accumulator that stores the brake fluid whose pressure is increased by the drive of the hydraulic pump by the drive control means; a hydraulic booster that assists the brake pedal operation by a driver by utilizing an accumulator hydraulic pressure that is the pressure of the brake fluid stored in the accumulator; pressure-adjusting means that adjusts the wheel cylinder hydraulic pressure that is the brake hydraulic pressure in the wheel cylinder; and detecting means that detects the accumulator hydraulic pressure.

The first vehicle motion control apparatus according to the present invention comprises automatic pressurization control means that controls the pressure-adjusting means by utilizing the accumulator hydraulic pressure, in order to perform an automatic pressurization control for generating the wheel cylinder hydraulic pressure for controlling the vehicle motion independently of the brake operation by the driver. It is characterized by further comprising restricting means that restricts the degree of the increase in the wheel cylinder hydraulic pressure generated by the automatic pressurization control, in case where the detected accumulator hydraulic pressure is less than the predetermined hydraulic pressure.

More specifically, the drive control means is configured to drive the hydraulic pump when the detected accumulator hydraulic pressure becomes less than the predetermined lower limit value, and to stop the hydraulic pump when the accumulator hydraulic pressure exceeds a predetermined upper limit value that is greater than the lower limit value. The restricting means is configured to use, as the predetermined hydraulic pressure, the value smaller than the lower limit value and greater than the lower limit value (i.e., the above-mentioned assist limit value) of the accumulator hydraulic pressure necessary for assisting the brake operation by the hydraulic booster.

With this configuration, when the automatic pressurization control is started with the accumulator hydraulic pressure being less than the predetermined hydraulic pressure (e.g., the value smaller than the lower limit value and greater than the assist limit value), the degree of the increase in the wheel cylinder hydraulic pressure generated by the automatic pressurization control is restricted. Accordingly, the supply speed of the brake fluid that is supplied to the wheel cylinder for increasing the wheel cylinder hydraulic pressure is restricted.

This means that the occurrence of the situation in which the accumulator hydraulic pressure still reduces during the increase of the wheel cylinder hydraulic pressure by the automatic pressurization control can be suppressed. Therefore, the occurrence of the situation in which the accumulator hydraulic pressure becomes less than the assist limit value can be suppressed, and hence, the assist force of the brake operation by the hydraulic booster can sufficiently be secured with stability even if the automatic pressurization control is executed. Specifically, the deceleration aimed by the driver for the brake pedal operation can stably be secured.

A second vehicle motion control apparatus according to the present invention is applied to a vehicle brake apparatus provided with brake operation signal output means (e.g., brake pedal operation stroke sensor, brake pedal operation force sensor, or the like) that detects the brake operation by a driver and outputs a signal corresponding to the brake operation, in addition to the hydraulic pump, drive control means, accumulator, pressure-adjusting means, and detecting means, those of which are the same as those in the first vehicle motion control apparatus.

The second vehicle motion control apparatus according to the present invention comprises brake control means that executes a brake-by-wire control for generating the wheel cylinder hydraulic pressure corresponding to the signal outputted from the brake operation signal output means (i.e., corresponding to the brake operation by the driver) by controlling the pressure-adjusting means with the use of the accumulator hydraulic pressure. It is characterized by further comprising the restricting means same as that in the first vehicle motion control apparatus.

More specifically, the drive control means is configured to drive the hydraulic pump when the detected accumulator hydraulic pressure becomes less than the predetermined lower limit value, and to stop the hydraulic pump when the accumulator hydraulic pressure exceeds the predetermined upper limit value that is greater than the lower limit value. The restricting means is configured to use, as the predetermined hydraulic pressure, the value smaller than the lower limit value and greater than the upper limit value (hereinafter referred to as "normal hydraulic pressure upper limit value) within the range of the wheel cylinder hydraulic pressure necessary for executing the brake-by-wire control.

The normal hydraulic pressure upper limit value is set to a value equal to the target wheel cylinder hydraulic pressure corresponding to the case where the assumed greatest brake operation by a driver (operation amount, operation stroke, operation force) is performed. In case where the normal hydraulic pressure upper limit value is set as described above, the situation in which the accumulator hydraulic pressure becomes less than the normal hydraulic pressure upper limit value means that the wheel cylinder hydraulic pressure aimed by a driver for the brake operation cannot be produced in case where the brake operation close to the above-mentioned assumed greatest brake operation is performed.

With this configuration, when the automatic pressurization control is started with the accumulator hydraulic pressure being less than the predetermined hydraulic pressure (e.g., the value smaller than the lower limit value and greater than the normal hydraulic pressure upper limit value), the degree of the increase in the wheel cylinder hydraulic pressure generated by the automatic pressurization control is restricted. Accordingly, the occurrence of the situation in which the accumulator hydraulic pressure still reduces during the increase of the wheel cylinder hydraulic pressure by the automatic pressurization control can be suppressed.

Therefore, the occurrence of the situation in which the accumulator hydraulic pressure becomes less than the normal hydraulic pressure upper limit value can be suppressed, and hence, the wheel cylinder hydraulic pressure aimed by the driver for the brake operation can stably be secured even if the automatic pressurization control is executed. Specifically, the deceleration aimed by the driver for the brake pedal operation can stably be secured.

In the first and second motion control apparatuses according to the present invention, the restricting means is preferably configured to restrict the degree of the increase in the wheel cylinder hydraulic pressure generated by the automatic pressurization control such that the accumulator hydraulic pressure at least increases during when the wheel cylinder hydraulic pressure is increased by the automatic pressurization control means, in case where the detected accumulator hydraulic pressure is less than the predetermined hydraulic pressure.

With this configuration, it can be secured that the accumulator hydraulic pressure increases during when the wheel cylinder hydraulic pressure increases by the automatic pressurization control. Accordingly, the occurrence of the situation in which the accumulator hydraulic pressure becomes less than the assist limit value or less than the normal hydraulic pressure upper limit value can more surely be suppressed.

In either one of the motion control apparatuses according to the present invention, the increasing slope of the wheel cylinder hydraulic pressure generated by the automatic pressurization control is specifically restricted to be not more than the predetermined slope, for example, in order to "restrict the degree of the increase in the wheel cylinder hydraulic pressure generated by the automatic pressurization control".

Specifically, the increasing slope of the hydraulic pressure generated by the automatic pressurization control is decided, in general, on the basis of the vehicle motion state, or the like, for example. In case where the accumulator hydraulic pressure is less than the predetermined hydraulic pressure and in case where the increasing slope of the wheel cylinder hydraulic pressure decided on the basis of the vehicle motion state or the like exceeds the predetermined slope, the increasing slope is changed (restricted) to the value equal to the predetermined slope.

Further, it is supposed that the automatic pressurization control means is configured to alternately execute a pressure-increasing control for increasing the wheel cylinder hydraulic pressure and a holding control for holding the wheel cylinder hydraulic pressure through the control of the pressure-adjusting means in case where the wheel cylinder hydraulic pressure is increased by the automatic pressurization control.

In this case, in order to "restrict the increasing slope of the wheel cylinder hydraulic pressure generated by the automatic pressurization control to be not more than the predetermined slope", the ratio of the time for continuing the pressure-increasing control to the sum of the time for continuing the pressure-increasing control and the time for continuing the holding control may be restricted to be not more than the predetermined value, for example. With this configuration, the average increasing slope of the wheel cylinder hydraulic pressure generated by the automatic pressurization control can be restricted to be not more than the predetermined slope.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 4 is a flowchart showing a routine executed by the CPU shown in FIG. 1 for calculating wheel speeds and the like;

DESCRIPTION OF THE PREFERRED EMBODIMENT

Figure 1:
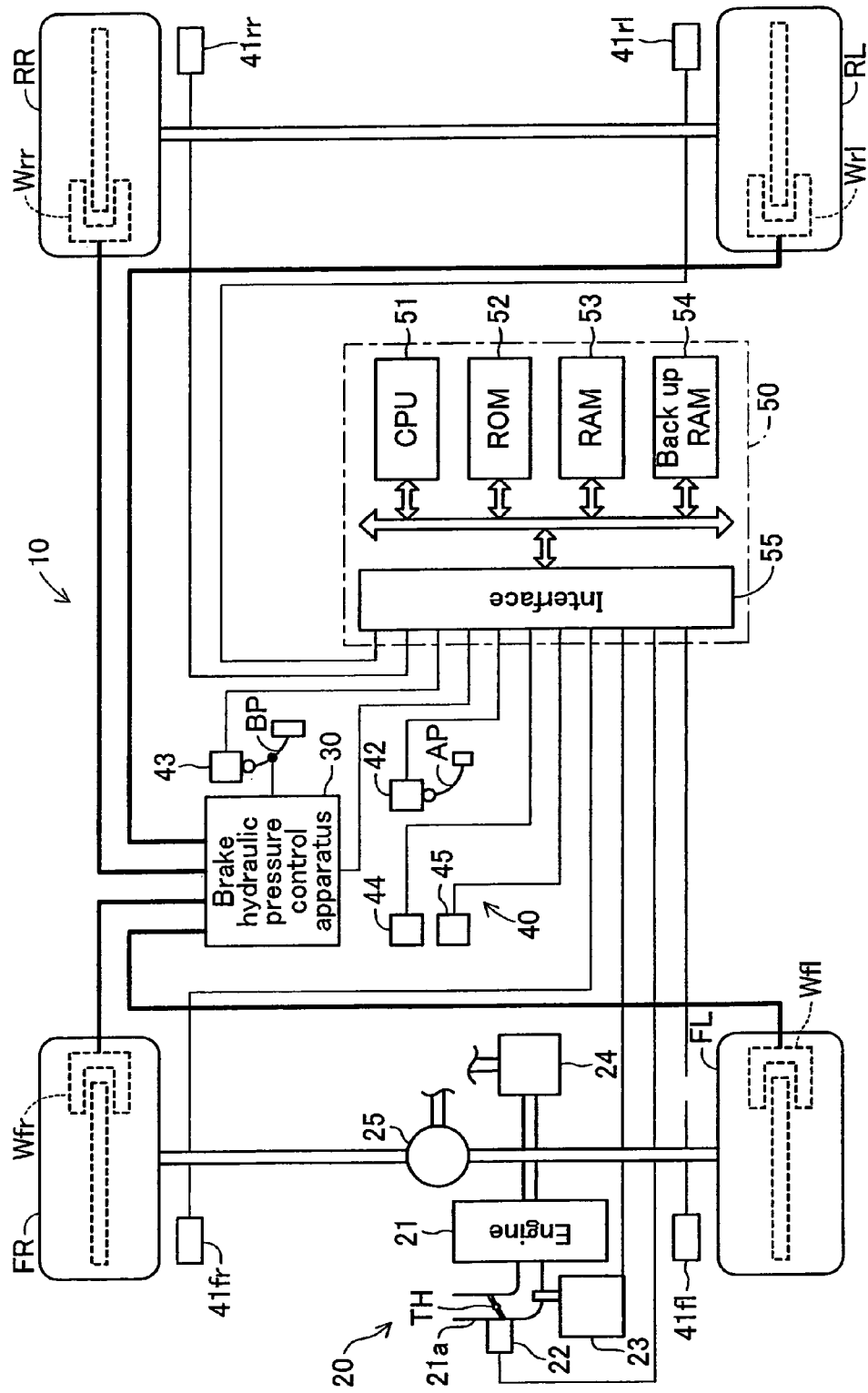
FIG. 1 is a schematic structural diagram of a vehicle equipped with a brake apparatus including a vehicle motion control apparatus according to a first embodiment of the present invention.

Below, a vehicle motion control apparatus according to an embodiment of the present invention will be described while referring to the drawings. FIG. 1 schematically illustrates a vehicle on which a brake apparatus 10 including a motion control apparatus according to the first embodiment of the present invention is mounted. The illustrated vehicle is a front-wheel-drive vehicle in which two front wheels are drive wheels.

This brake apparatus 10 has a drive force transmission mechanism section 20 which generates a drive force and transmits it to drive wheels FL and FR; a brake hydraulic pressure control apparatus 30 for generating a brake hydraulic pressure in each wheel; a sensor section 40 composed of various sensors; and a motion control apparatus 50.

The drive force transmission mechanism section 20 comprises an engine 21 which generates a drive force; a throttle valve actuator 22 which controls the opening (throttle valve opening TA) of a throttle valve TH which is disposed in an intake pipe 21a of the engine 21 and which varies the open cross-sectional area of the intake passage; and a fuel injection apparatus 23 which includes fuel infectors which spray fuel in the vicinity of unillustrated intake ports of the engine 21.

The drive force transmission mechanism section 20 also comprises a transmission 24 whose input shaft is connected to the output shaft of the engine 21; and a front-wheel-side differential 25 which is connected to the output shaft of the transmission 24 and properly distributes and transmits the drive force from the engine 21 to the front wheels FL and FR.

Figure 2:
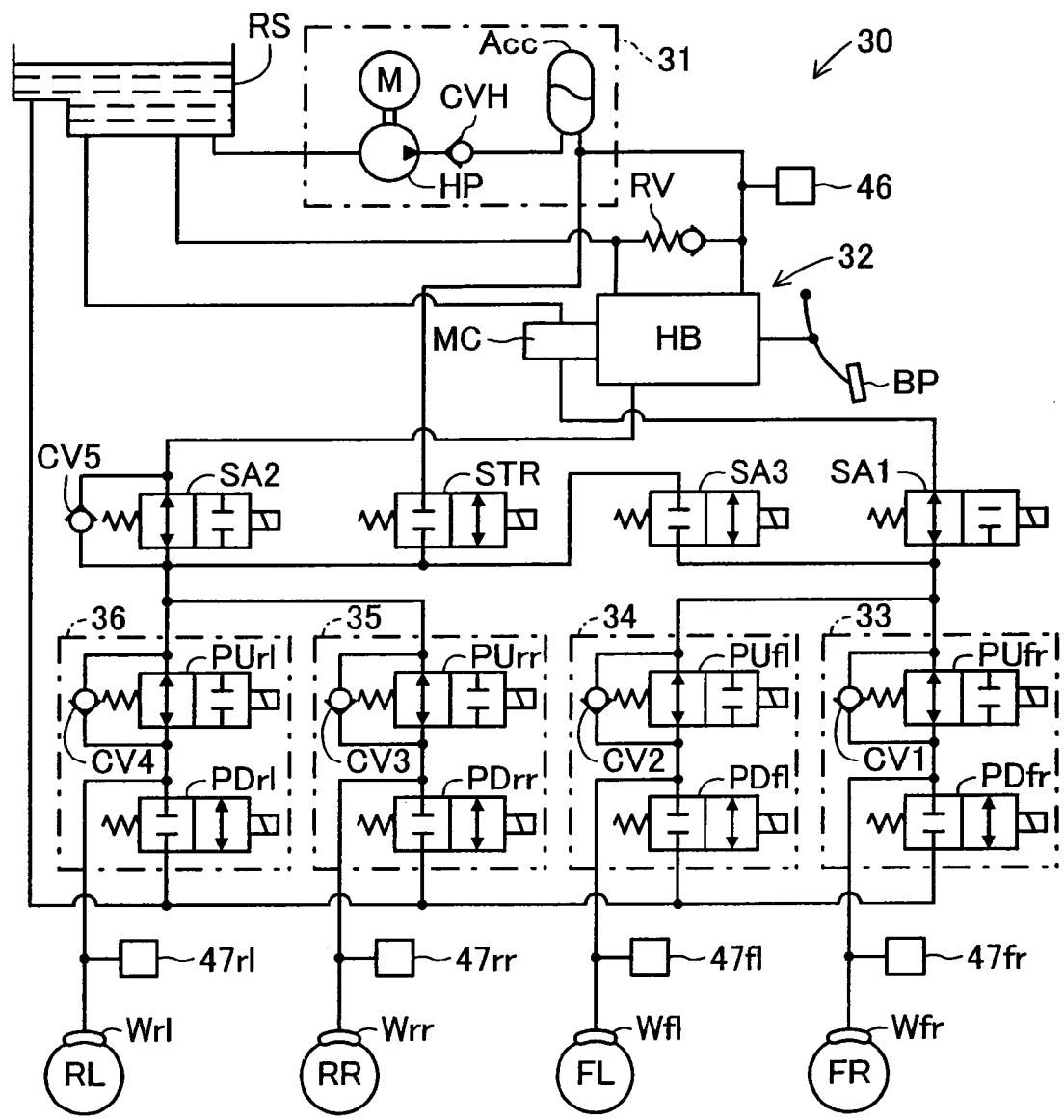
FIG. 2 is a schematic structural diagram of the brake hydraulic pressure control apparatus shown in FIG. 1.

As schematically shown in FIG. 2, the brake hydraulic pressure control apparatus 30 includes a high-pressure generating section 31; a brake hydraulic pressure generating section 32 which generates brake hydraulic pressure corresponding to the operating force of a brake pedal BP; and FR brake hydraulic pressure adjusting section 33, FL brake hydraulic pressure adjusting section 34, RR brake hydraulic pressure adjusting section 35 and RL brake hydraulic pressure adjusting section 36, each of which can adjust the brake hydraulic pressure supplied to each of wheel cylinders Wfr, Wfl, Wrr and Wrl arranged at each wheel FR, FL, RR and RL.

The high-pressure generating section 31 is configured to include an electric motor M; a hydraulic pump HP that is driven by the electric motor M and that pumps the brake fluid in a reservoir RS and discharges and boosts the same; and an accumulator Acc that is connected to the discharge side of the hydraulic pump HP via a check valve CVH and stores brake fluid boosted by the hydraulic pump HP.

By the instruction from a motion control apparatus 50 (CPU 51) described later, the electric motor M is driven when the hydraulic pressure in the accumulator Acc (hereinafter referred to as "accumulator hydraulic pressure Pacc") is less than a predetermined lower limit value Pon, while it is halted when the accumulator hydraulic pressure Pacc exceeds a predetermined upper limit value Poff (>Pon). With this operation, the accumulator hydraulic pressure Pacc is in principle adjusted to "pressure (high-pressure) within the range between the lower limit value Pon and the upper limit value Poff". Note that the lower limit value Pon is set to a value sufficiently greater than the lower limit value (hereinafter referred to as "assist limit value Passist") of the accumulator hydraulic pressure Pacc required for the sufficient assisting of the brake pedal operation by a later-described hydraulic booster HB.

A relief valve RV is arranged between the accumulator Acc and the reservoir RS. When the accumulator hydraulic pressure Pacc becomes extraordinarily higher than the upper limit value Poff, the brake fluid in the accumulator Acc is returned to the reservoir RS. This operation protects a hydraulic circuit in the high-pressure generating section 31.

The brake hydraulic pressure generating section 32 is composed of a hydraulic booster HB that is driven according to the operation of the brake pedal BP and a master cylinder MC connected to the hydraulic booster HB. The hydraulic booster HB utilizes the accumulator hydraulic pressure Pacc, which is supplied from the high-pressure generating section 31 and adjusted to be high pressure, so as to assist the operating force of the brake pedal BP by a prescribed ratio and transmits the assisted operating force to the master cylinder MC.

The master cylinder MC generates master cylinder hydraulic pressure corresponding to the assisted operating force. Further, the hydraulic booster HB, by inputting this master cylinder hydraulic pressure, generates regulator hydraulic pressure which is substantially the same as the master cylinder hydraulic pressure and which corresponds to the assisted operating force. The structures and operations of the master cylinder MC and the hydraulic booster HB are well known, and therefore an explanation of the details thereof will be omitted. In this manner, the master cylinder MC and the hydraulic booster HB generate master cylinder hydraulic pressure and regulator hydraulic pressure corresponding to the operating force of the brake pedal BP.

A control valve SA1 which is a normally-open solenoid on-off valve of a 2-port, 2-position type is arranged between the master cylinder MC and each of the upstream side of the FR brake hydraulic pressure adjusting section 33 and the upstream side of the FL brake hydraulic pressure adjusting section 34. Similarly, a control valve SA2 which is a normally-open solenoid on-off valve of a 2-port, 2-position type is arranged between the hydraulic booster HB and each of the upstream side of the RR brake hydraulic pressure adjusting section 35 and the upstream side of the RL brake hydraulic pressure adjusting section 36.

A control valve SA3 which is a normally-closed solenoid on-off valve of a 2-port, 2-position type is arranged at a pipe line linking each of the upstream side of the FR brake hydraulic pressure adjusting section 33 and the upstream side of the FL brake hydraulic pressure adjusting section 34 and each of the upstream side of the RR brake hydraulic pressure adjusting section 35 and the RL brake hydraulic pressure adjusting section 36.

Further, a changeover valve STR which is a normally-closed solenoid on-off valve of a 2-port, 2-position type is arranged between the high-pressure generating section 31 and the aforesaid pipe line.

When the control valve SA1 and the control valve SA3 (and the changeover valve STR) are in their first position, the master cylinder hydraulic pressure is supplied to each of the upstream side of the FR brake hydraulic pressure adjusting section 33 and the upstream side of the FL brake hydraulic pressure adjusting section 34. When the control valves SA1 and SA2 and the changeover valve STR are in their second position (in an excited state), the accumulator hydraulic pressure Pacc (high pressure) generated from the high-pressure generating section 31 is supplied to each of the upstream side of the FR brake hydraulic pressure adjusting section 33 and the upstream side of the FL brake hydraulic pressure adjusting section 34.

Similarly, when the control valve SA2, control valve SA3, and the changeover valve STR are in their first position, the regulator hydraulic pressure is supplied to each of the upstream side of the RR brake hydraulic pressure adjusting section 35 and the upstream side of the RL brake hydraulic pressure adjusting section 36. When the control valves SA2 and SA3 and the changeover valve STR are in their second position, the accumulator hydraulic pressure Pacc is supplied to each of the upstream side of the RR brake hydraulic pressure adjusting section 35 and the upstream side of the RL brake hydraulic pressure adjusting section 36.

The FR brake hydraulic pressure adjusting section 33 consists of a pressure-increasing valve PUfr, which is a normally-open solenoid on-off valve of a 2-port, 2-position type, and a pressure-reducing valve PDfr, which is a normally-closed solenoid on-off valve of a 2-port, 2-position type. When the pressure-increasing valve PUfr is in its first state (in a position in a non-excited state) as shown in FIG. 2, it establishes the communication between upstream side of the FR brake hydraulic pressure adjusting section 33 and the wheel cylinder Wfr, while when it is in its second state (in a position in an excited state), it brakes communication between the upstream side of the FR brake hydraulic pressure adjusting section 33 and the wheel cylinder Wfr. When the pressure-reducing valve PDfr is in its first state (in a position in a non-excited state) as shown in FIG. 2, it brakes the communication between the wheel cylinder Wfr and the reservoir RS, while when it is in its second state (in a position in an excited state), it establishes the communication between the wheel cylinder Wfr and the reservoir RS.

Thus, the brake hydraulic pressure in the wheel cylinder Wfr (wheel cylinder hydraulic pressure Pwfr) is increased (pressure-increasing control) since the hydraulic pressure at the upstream side of the FR brake hydraulic pressure adjusting section 33 is supplied into the wheel cylinder Wfr when the pressure-increasing valve PUfr and the pressure-reducing valve PDfr are in their first state. When the pressure-increasing valve PUfr is in its second state and the pressure-reducing valve PDfr is in its first state, the wheel cylinder hydraulic pressure Pwfr at the time of changeover is maintained (holding control), regardless of the hydraulic pressure in the upstream side of the FR brake hydraulic pressure adjusting section 33. When the pressure-increasing valve PUfr and the pressure-reducing valve PDfr are in their second state, the wheel cylinder hydraulic pressure Pwfr is reduced (pressure-reducing control) since the brake fluid in the wheel cylinder Wfr is returned to the reservoir RS.

A check valve CV1 which allows flow of the brake fluid in only one direction from the wheel cylinder Wfr side to the upstream side of the FR brake hydraulic pressure adjusting section 33 is connected in parallel with the pressure-increasing valve PUfr. As a result, when the control valve SA1 is in its first state and the brake pedal BP is released after being operated, the wheel cylinder hydraulic pressure Pwfr is rapidly decreased.

Similarly, the FL brake hydraulic pressure adjusting section 34, the RR brake hydraulic pressure adjusting section 35, and the RL brake hydraulic pressure adjusting section 36 comprise a pressure-increasing valve PUfl and a pressure-reducing valve PDfl, a pressure-increasing valve PUrr and a pressure-reducing valve PDrr, and a pressure-increasing valve PUrl and a pressure-reducing valve PDrl, respectively. By controlling the positions of each pressure-increasing valve and pressure-reducing valve, the brake hydraulic pressure in the wheel cylinder Wfl, the wheel cylinder Wrr, and the wheel cylinder Wrl (wheel cylinder hydraulic pressures Pwfl, Pwrr, Pwfr) can be increased, held, or decreased. Check valves CV2, CV3, and CV4 are provided in parallel with the pressure-increasing valves PUfl, PUrr, and PUrl, respectively, to provide the same function as that of the check valve CV1.

Further, a check valve CV5 that allows flow of the brake fluid in only one direction from the upstream side to the downstream side is connected in parallel with the control valve SA2. As a result, when the control valve SA2 is in its second state and the communication between the hydraulic booster HB and the RR brake hydraulic pressure adjusting section 35 and the RL brake hydraulic pressure adjusting section 36 is cut off, the wheel cylinder hydraulic pressures Pwrr and Pwrl can be increased by operating the brake pedal BP.

With the structure described above, when all the solenoid valves are in their first states (non-excited positions), the brake hydraulic pressure control apparatus 30 supplies to each wheel cylinder a brake hydraulic pressure corresponding to the operating force of the brake pedal BP. In this state, it becomes possible to increase, maintain, and decrease only the brake hydraulic pressure in, for example, the wheel cylinder Wrr within the range not more than the brake hydraulic pressure (i.e., master cylinder hydraulic pressure) corresponding to the operation force on the brake pedal through control of the pressure-increasing valve PUrr and the pressure-reducing valve PDrr.

By changing the control valve SA1, changeover valve STR and pressure increasing valve PUfl to the second position and controlling the pressure increasing valve PUfr and pressure reducing valve PDfr respectively, the brake hydraulic pressure control apparatus 30 can increase, maintain, and reduce only the wheel cylinder hydraulic pressure Pwfr within a range not more than the accumulator hydraulic pressure Pacc (high pressure) by utilizing the accumulator hydraulic pressure Pacc (high pressure) generated from the high-pressure generating section 31 while the wheel cylinder hydraulic pressure Pwfl is maintained to be "0" under a state where the brake pedal BP is not operated (is released).

As described above, the brake hydraulic pressure control apparatus 30 independently controls the wheel cylinder hydraulic pressure of each wheel regardless of the operation on the brake pedal BP, thereby being capable of exerting predetermined braking force on every independent wheel. As a result, the brake hydraulic pressure control apparatus 30 can achieve known ABS control and later-described automatic pressurization control (over-steer suppression control) by the instruction from the motion control apparatus 50.

Referring again to FIG. 1, the sensor section 40 is composed of electromagnetic pick-up type wheel speed sensors 41 that output a signal having a pulse corresponding to the wheel speeds of the wheels , an accelerator opening sensor 42 that detects an operating amount of an accelerator pedal AP operated by a driver and outputs a signal showing the operating amount of the accelerator pedal AP (accelerator operation amount Accp), a brake switch 43 that outputs an ON/OFF signal according to the operation and non-operation of the brake pedal BP, a yaw rate sensor 44 that detects a yaw rate of a vehicle and outputs a signal indicating a yaw rate Yr, a lateral acceleration sensor 45 that detects a lateral acceleration of a vehicle and outputs a signal indicating a lateral acceleration Gy, an accumulator hydraulic pressure sensor 46 (see FIG. 2) that detects the accumulator hydraulic pressure Pacc and outputs a signal indicating the accumulator hydraulic pressure Pacc, and wheel cylinder hydraulic pressure sensors 47 (see FIG. 2) that detect a wheel cylinder hydraulic pressure Pw and output a signal indicating the wheel cylinder hydraulic pressure Pw**.

In the following description, the symbol "" appended to various variables and the like collectively represents the symbols fl, fr, rl, and rr and indicates that the particular variable or the like applies to all of the wheels FR, FL, etc. of the vehicle. For example, the wheel cylinder hydraulic pressure Pw collectively indicates the wheel cylinder hydraulic pressure Pwfr, wheel cylinder hydraulic pressure Pwfl, wheel cylinder hydraulic pressure Pwrr, and wheel cylinder hydraulic pressure Pwrl.

The yaw rate Yr and the lateral acceleration Gy are set to take a positive value when the vehicle turns counterclockwise (seen from the upper side of the vehicle), while take a negative value when the vehicle turns clockwise.

The motion control apparatus 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which stores data when the power supply is on and which maintains the stored data when the power supply is cut off; an interface 55 containing A/D converters; and the like. The above components are interconnected via a bus. The interface 55 is connected to the sensors 41 to 47. The interface 55 supplies signals from the sensors 41 to 47 to the CPU 51. Further, in accordance with instructions from the CPU 51, the interface 55 transmits a driving signal to the solenoid valves and the motor M of the brake hydraulic pressure control apparatus 30, throttle valve actuator 22 and fuel injection apparatus 23.

By virtue of the above-described configuration, the throttle valve actuator 22 drives the throttle valve TH such that the throttle valve opening TA basically coincides with an opening corresponding to the accelerator operation amount Accp; and the fuel injection apparatus 23 injects fuel of a quantity which is required to obtain a predetermined target air-fuel ratio (theoretical air-fuel ratio) for cylinder-interior intake air quantity, which is the quantity of air taken into each cylinder.

[Outline of OS Suppression Control]

Subsequently explained is the outline of an over-steer suppression control (OS suppression control) as an automatic pressurization control executed by the vehicle brake apparatus 10 (hereinafter referred to as "present apparatus") including the motion control apparatus according to the first embodiment of the present invention thus configured.

The vehicle body slip angle θ used for the OS suppression control is defined as "an angle made by the direction of the vehicle body (i.e., longitudinal direction of the vehicle body) and the advancing direction of the vehicle body". The vehicle body slip angle θ is set to assume a positive value when the direction of the vehicle body is shifted in the counterclockwise direction, seen from the upper side of the vehicle, with respect to the advancing direction of the vehicle body, and assume a negative value when the direction of the vehicle body is shifted in the clockwise direction, seen from the upper side of the vehicle, with respect to the advancing direction of the vehicle body. Therefore, the vehicle body slip angle θ can be obtained in accordance with the following equation (1). In the equation (1), Vso is a vehicle body speed.

$$\theta = \int (Yr - (Gy/Vso)) \tag{1}$$

The great vehicle body slip angle θ means that the vehicle is in a so-called "skid" state (i.e., in an over-steer state). Therefore, the present apparatus executes the OS suppression control for suppressing the over-steer state when a predetermined OS suppression control start condition including the state in which the absolute value of the vehicle body slip angle θ is greater than a predetermined value (>0) is established.

Specifically, the present apparatus forcibly applies to the wheel cylinder W** of the front wheel at the outer side of a turning locus an OS-suppression-control-use hydraulic pressure, independent of the operation of the brake pedal BP, in accordance with the giving pattern of the OS-suppression-control-use hydraulic pressure set on the basis of the absolute value of the vehicle body slip angle θ at the time when the OS suppression control start condition is established (accordingly, braking force corresponding to the OS-suppression-control-use hydraulic pressure is forcibly applied to the front wheel at the outer side of the turning locus). Accordingly, a yawing moment in the direction opposite to the turning direction is forcibly exerted on the vehicle, whereby the control is made such that the absolute value of the vehicle body slip angle θ decreases. As a result, the stability in the turning of the vehicle can be maintained.

The aforesaid "giving pattern of the OS-suppression-control-use hydraulic pressure" may employ a pattern in which the OS-suppression-control-use hydraulic pressure is firstly increased to the support pressure Pt with the increasing slope Gradup by the alternate execution of the pressure-increasing control and the holding control, then, is maintained to be the support pressure Pt during a predetermined period by the continuation of the holding control, and then, is decreased with a predetermined decreasing slope by the alternate execution of the pressure-reducing control and the holding control.

The increasing slope Gradup and the support pressure Pt are determined in principle on the basis of the vehicle body slip angle θ at the time of establishing the OS suppression control start condition. Specifically, both of the increasing slope Gradup and the support pressure Pt are set to a great value as the absolute value of the vehicle body slip angle θ at the time of establishing the OS suppression control start condition is great.

Actually, the increasing slope Gradup is represented by the following equation (2) in this embodiment. In the following equation (2), Tup is a continuation time of one pressure-increasing control, and Thold is a continuation time of one holding control. Specifically, "the combination of Tup and Thold" corresponding to the increasing slope Gradup is determined in principle on the basis of the vehicle body slip angle θ at the time of establishing the OS suppression control start condition.

$$Gradup = Tup/(Tup+Thold) \qquad (2)$$

Further, in case where the present apparatus executes the OS suppression control, it performs, in addition to the above-mentioned application of braking force by means of OS-suppression-control-use hydraulic pressure, the engine-output lowering control which lowers a predetermined amount the output of the engine 21 from a level corresponding to the accelerator pedal operation amount Accp. As a result, centrifugal force acting on the vehicle decreases because of the lowered vehicle body speed, so that the turning-trace performance of the vehicle can be maintained. The above is the outline of the OS suppression control.

Stably Ensuring Assist Force of Brake Operation by Means of Hydraulic Booster HB by Restriction on Increasing Slope Gradup of OS-Suppression-Control-Use Hydraulic Pressure As described above, the present apparatus determines in principle the increasing slope Gradup (specifically, "the combination of Tup and Thold") on the basis of the vehicle body slip angle θs at the time of establishing the OS suppression control start condition. However, the present apparatus restricts the increasing slope Gradup to a value not more than a certain value (restriction value α) under a predetermined condition, regardless of the value determined based upon the vehicle body slip angle θs. This will be explained hereinafter with reference to FIG. 3.

Figure 3:
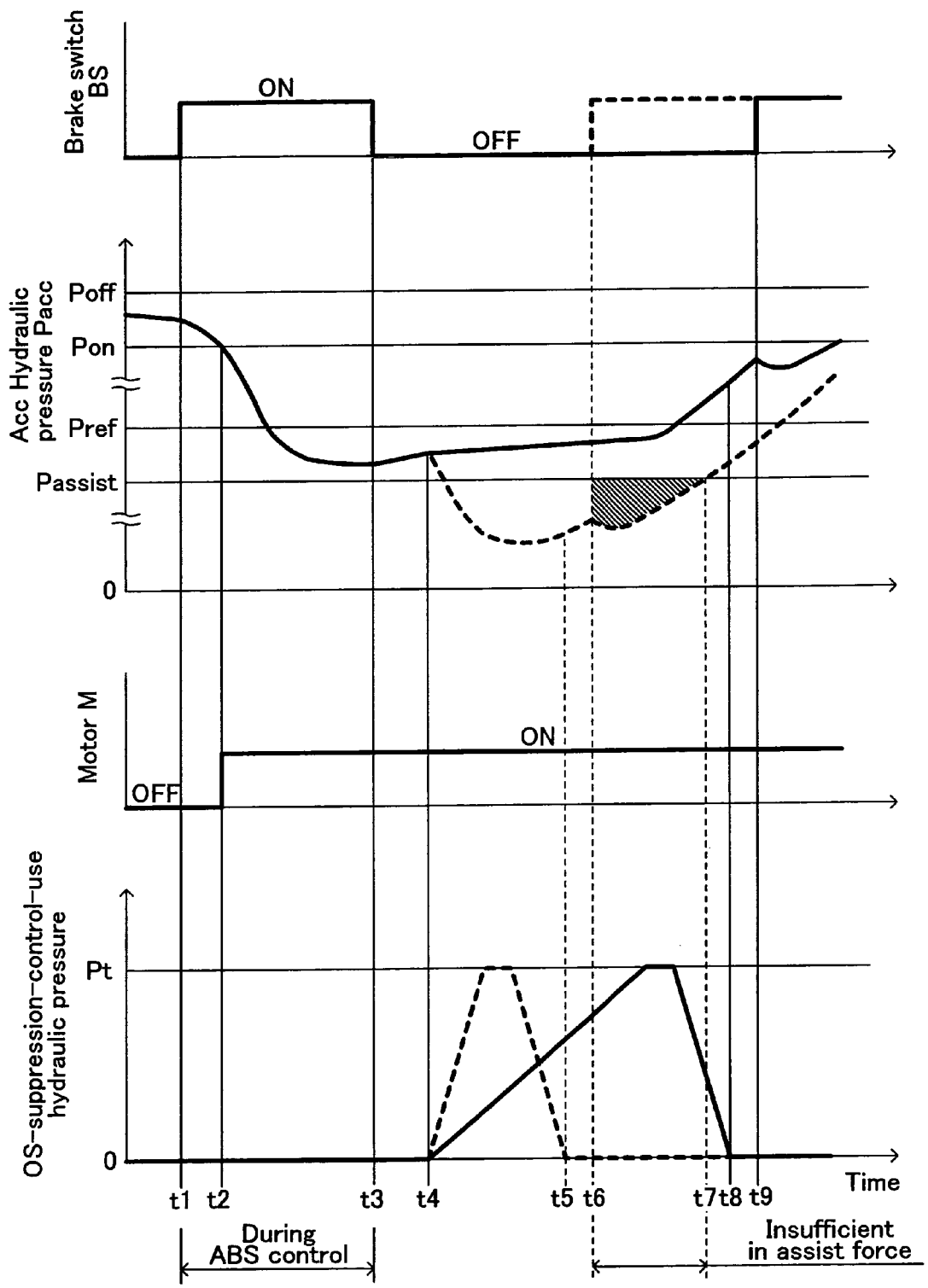
FIG. 3 is a time chart showing a change in an output from a brake switch, an accumulator hydraulic pressure, a driving state of a motor, and an over-steer-suppression-control-use hydraulic pressure, in case where the over-steer suppression control is started with the accumulator hydraulic pressure reduced due to the execution of the ABS control, and it is a time chart showing the case where the brake operation is performed with the accumulator hydraulic pressure reduced to be less than an assist limit value.

FIG. 3 is a time chart showing a change in the output from the brake switch 43, accumulator hydraulic pressure Pacc, driving state of the motor MT, and OS-suppression-control-use hydraulic pressure, in case where the ABS control is executed during the period from time t1 to time t3, and the OS suppression control is started at time t4 that is immediately after the end of the ABS control.

As shown in FIG. 3, it is supposed that the brake pedal BP is not operated (i.e., the brake switch 43 outputs OFF signal), the accumulator hydraulic pressure Pacc is placed between the lower limit value Pon and the upper limit value Poff, and the motor MT is in its OFF state (accordingly, the hydraulic pump HP is halted), before time t1.

When a driver starts the operation on the brake pedal BP (accordingly, the brake switch 43 starts to output ON signal) to start the ABS control at time t1, the brake fluid is returned to the reservoir RS (see FIG. 2) via the pressure-reducing valve PD from the wheel cylinder W to which the ABS control is to be executed during the execution of the pressure-reducing control.

With this operation, the brake fluid is supplied into the brake hydraulic circuit, so that the accumulator hydraulic pressure Pacc decreases. It is supposed that the accumulator hydraulic pressure Pacc consequently becomes less than the lower limit value Pon at time t2. In this case, the motor M is maintained in its ON state (accordingly, the hydraulic pump HP is maintained in its driving state) after time t2. As a result, the accumulator hydraulic pressure Pacc immediately rises to return to the value greater than the lower limit value Pon, when the discharge flow rate of the brake fluid by the hydraulic pump HP is greater than the average speed of the brake fluid (i.e., the consumption speed of the brake fluid) returned to the reservoir RS.

On the other hand, it is assumed that, in the example shown in FIG. 3, the consumption speed of the brake fluid is great due to the frequent execution of the pressure-increasing and pressure-reducing controls, and hence, the consumption speed of the brake fluid exceeds the discharge flow rate of the brake fluid by the hydraulic pump HP. In this case, the accumulator hydraulic pressure Pacc still decreases even if the hydraulic pump HP keeps on being driven. Consequently, the accumulator hydraulic pressure Pacc is supposed to be decreased to a value near the assist limit value Passist at time t3 that is the time when the ABS control is ended.

The OS suppression control is started at time t4 according to the establishment of the OS suppression control start condition with the accumulator hydraulic pressure Pacc decreased to the value near the assist limit value Passist as described above. It is supposed that, in the example shown in FIG. 3, the vehicle body slip angle θs at the time (i.e., time t4) of establishing the OS suppression control start condition is relatively great, and hence, the increasing slope Gradup determined based upon the vehicle body slip angle θs is set to a relatively great value.

The broken line in FIG. 3 indicates the "giving pattern of the OS-suppression-control-use hydraulic pressure" when the increasing slope Gradup is set to the above-mentioned "great value based upon the vehicle body slip angle θs" and the change in the accumulator hydraulic pressure Pacc after the time (time t4) of starting the OS suppression control. In this case, the OS suppression control is ended at time t5.

When the increasing slope Gradup is set to the above-mentioned "great value based upon the vehicle body slip angle θs", there may be the case where the supply speed of the brake fluid supplied to the wheel cylinder W for increasing the wheel cylinder hydraulic pressure Pw for the front wheel, to which the OS suppression control is to be performed, at the outer side of the turning locus becomes great, and therefore, the supply speed exceeds the discharge flow rate of the brake fluid by the hydraulic pump HP.

In this case, the accumulator hydraulic pressure Pacc decreases after time t4 even if the hydraulic pump HP keeps on being driven, as indicated by the broken line in FIG. 3. As a result, there may be the case where the accumulator hydraulic pressure Pacc changes below the assist limit value Passist after time t4.

It is considered that, in this case, after time t5 that is the time when the OS suppression control is ended, a driver operates the brake pedal BP at time t6, which is the time before time t7 when the accumulator hydraulic pressure Pacc again becomes greater than the assist limit value Passist by means of the hydraulic pump Hp that is still continuously driven.

In this case a problem may arise in which the brake pedal operation by the driver is being executed over the period from time t6 to time t7 (see the hatched portion in FIG. 3) where the accumulator hydraulic pressure Pacc becomes less than the assist limit value Passist.

The present apparatus restricts the increasing slope Gradup to be not more than a certain restriction value α when the accumulator hydraulic pressure Pacc at the time (time t4) of starting the OS suppression control is less than "a certain reference hydraulic pressure Pref that is slightly greater than the assist limit value Passist and sufficiently smaller than the lower limit value Pon" (see FIG. 3).

More specifically, the present apparatus changes (restricts) the increasing slope Gradup to a value equal to the restriction value α, in case where the accumulator hydraulic pressure Pacc at the time (time t4) of starting the OS suppression control is less than the aforesaid reference hydraulic pressure Pref and "the increasing slope Gradup determined on the basis of the vehicle body slip angle θs" exceeds the restriction value α. Specifically, the aforesaid Tup and Thold are changed respectively to the value Tuplim and Tholdlim that are the values corresponding to the restriction value α.

The restriction value α is the increasing slope Gradup necessary for setting the supply speed of the brake fluid supplied to the wheel cylinder W in order to increase the wheel cylinder hydraulic pressure Pw of the front wheel, to which the OS suppression control is to be executed, at the outer side of the turning locus, so as to be the value slightly smaller than the lowest discharge flow rate of the brake fluid by the hydraulic pump HP.

The solid line shown in FIG. 3 after time t4 indicates the "giving pattern of the OS-suppression-control-use hydraulic pressure" and the change in the accumulator hydraulic pressure Pacc after the time (time t4) of starting the OS suppression control, in case where the increasing slope Gradup is restricted to the aforesaid restriction value α. In this case, the OS suppression control is ended at time t8.

When the increasing slope Gradup is restricted to the restriction value α as described above, the supply speed of the brake fluid supplied to the wheel cylinder W in order to increase the wheel cylinder hydraulic pressure Pw to which the OS suppression control is to be executed is always less than the discharge flow rate of the brake fluid by the hydraulic pump HP. As a result, it can be secured that the accumulator hydraulic pressure Pacc always increases during when the wheel cylinder hydraulic pressure Pw** increases by the OS suppression control.

Therefore, there never (hardly) occurs the situation in which the accumulator hydraulic pressure Pacc becomes less than the assist limit value Passist after time t8 that is the time when the OS suppression control is ended. Accordingly, even if a driver performs again the operation on the brake pedal at time t9 that is after time t8 when the OS suppression control is ended, the assist force of the brake pedal operation by the hydraulic booster HB can sufficiently be secured with stability.

Actual Operation

The actual operation of the brake apparatus 10 including the vehicle motion control apparatus according to the first embodiment of the present invention having the above-described structure, will be explained while referring to FIGS. 4 and 5, which show, in the form of flowcharts, routines which are executed by the CPU 51 of the motion control apparatus 50.

Figure 4:
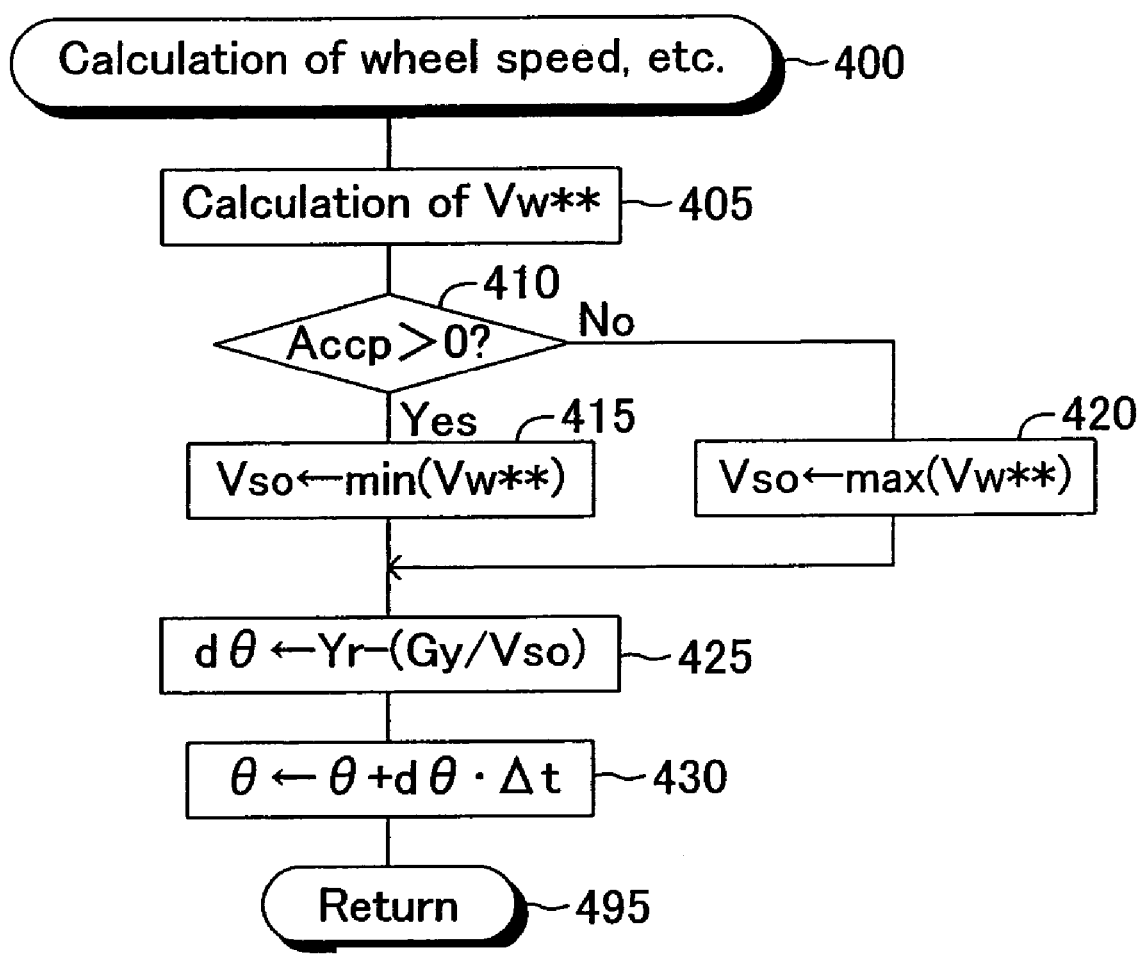

The CPU 51 repeatedly executes a routine shown in FIG. 4 for calculation of wheel speeds, etc. every time a predetermined time (execution interval Δt: e.g., 6 msec) elapses. Accordingly, when a predetermined timing has come, the CPU 51 initiates the processing from Step 400 and proceeds to Step 405 so as to respectively calculate present wheel speeds (outer circumferential speeds) Vw of the wheels . Specifically, the CPU 51 respectively calculates the wheel speeds Vw on the basis of the fluctuation frequencies of the output values of the wheel speed sensors 41.

Next, the CPU 51 proceeds to Step 410 and determines whether the accelerator pedal operation amount Accp obtained from the accelerator opening sensor 42 is greater than "0" (that is, whether the vehicle is in an accelerating state or not). When the CPU 51 makes a "YES" determination, it proceeds to Step 415 so as to select the smallest value from the wheel speeds Vw as the estimated vehicle body speed Vso. On the other hand, when the CPU 51 makes a "NO" determination, it proceeds to Step 420 so as to select the largest value from the wheel speeds Vw as the estimated vehicle body speed Vso.

Subsequently, the CPU 51 proceeds to Step 425 so as to obtain a time-differentiated value dθ of the vehicle body slip angle θ on the basis of the yaw rate Yr at the present time obtained from the yaw rate sensor 44, the lateral acceleration Gy at the present time obtained from the lateral acceleration sensor 45, the obtained vehicle body speed Vso, and the equation corresponding to the equation (1) and described in Step 425. Then, at the next Step 430, the CPU 51 adds the product (i.e., the increased amount of the vehicle body slip angle θ during the execution interval Δt) of the obtained time-differentiated value dθ and the execution interval Δt to the vehicle body slip angle θ at the present time, to thereby update the vehicle body slip angle θ (i.e., the latest value of the vehicle body slip angle θ is obtained). Then, the CPU 51 proceeds to Step 495 so as to end the current execution of the present routine.

Figure 5:
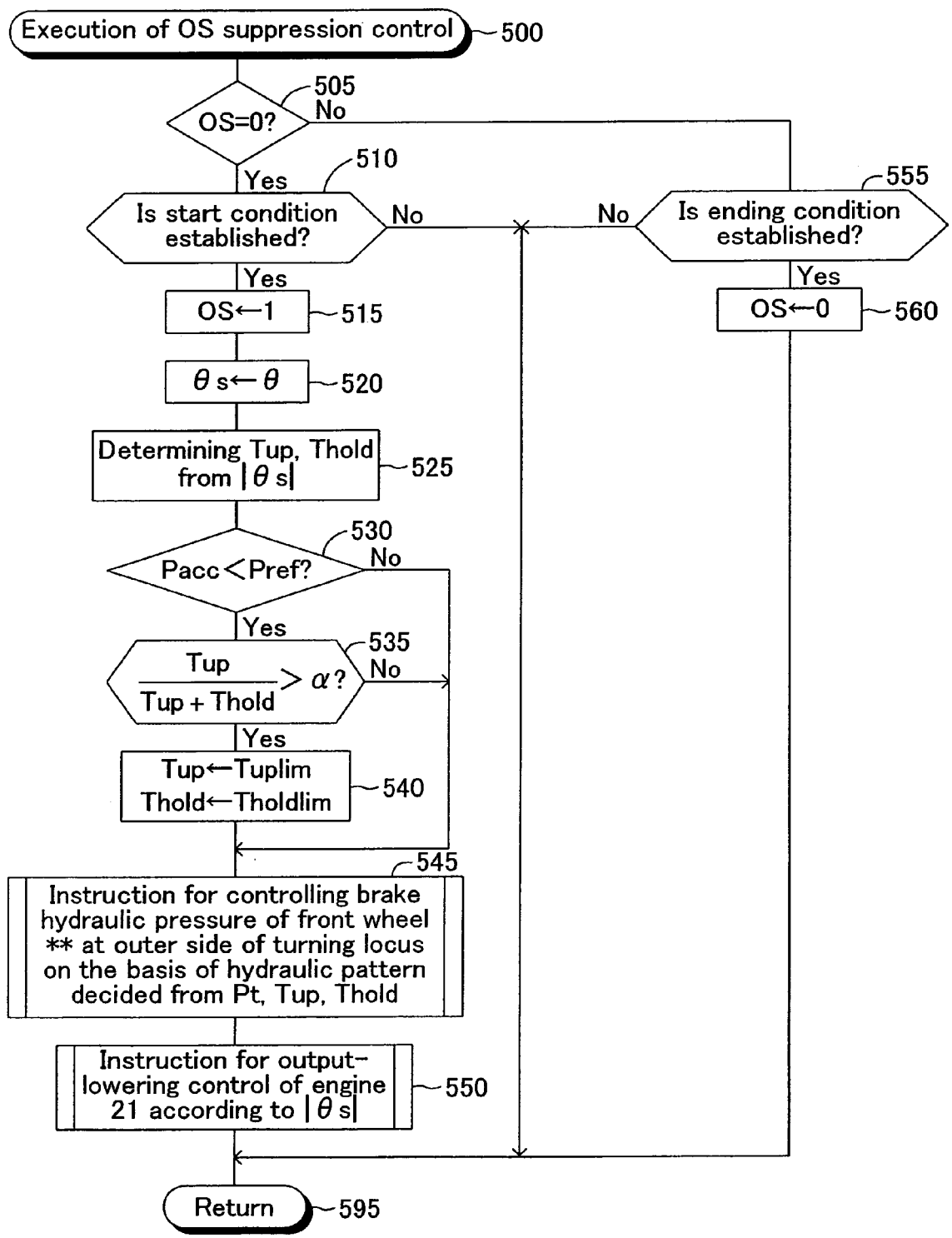
FIG. 5 is a flowchart showing a routine executed by the CPU shown in FIG. 1 for executing the over-steer suppression control.

Further, the CPU 51 repeatedly executes a routine shown in FIG. 5 for executing the OS suppression control every time a predetermined time (execution interval Δt: e.g., 6 msec) elapses. Accordingly, when a predetermined timing has come, the CPU 51 initiates the processing from Step 500 and proceeds to Step 505 so as to determine whether the value of a flag OS is "0" or not. The flag OS represents that the OS suppression control is being executed when the value thereof is "1" and that the OS suppression control is not being executed when the value thereof is "0".

Now, the description will be continued on the assumption that the OS suppression control is not being executed (OS=0) and the aforesaid "OS suppression control start condition" is not established. In this case, the CPU 51 makes a "YES" determination at Step 505, and proceeds to Step 510 so as to determine whether the aforesaid "OS suppression controls start condition" is established or not. Here, it makes a "NO" determination, and directly proceeds to Step 595 to end the current execution of the present routine.

After that, until the "OS suppression control start condition" is established, the CPU 51 repeatedly executes the processes at Steps 505 and 510. Therefore, the value of the flag OS is maintained to be "0" (see before time t4 in FIG. 3).

Subsequently explained is the case in which the "OS suppression control start condition" is established with this state (see time t4 in FIG. 3). In this case, the CPU 51 makes a "YES" determination when proceeding to Step 510, and then, proceeds to Step 515 to change the value of the flag OS to "1" from "0".

Then, the CPU 51 proceeds to Step 520 for setting "the vehicle body slip angle θs at the time of establishing the OS suppression control start condition" to the latest value of the vehicle body slip angle θ that is updated at the previous Step 430. Then, the CPU 51 proceeds to Step 525 so as to decide the "combination of Tup and Thold" corresponding to the increasing slope Gradup and the support pressure Pt, on the basis of the absolute value of the "vehicle body slip angle θ at the time of establishing the OS suppression control start condition".

Subsequently, the CPU 51 proceeds to Step 530 to determine whether the accumulator hydraulic pressure Pacc at the present time obtained from the accumulator hydraulic pressure sensor 46 is less than the aforesaid reference hydraulic pressure Pref or not. When the CPU 51 makes a "YES" determination, it determines at the following Step 535 whether the "increasing slope Gradup decided based upon the vehicle body slip angle θ " indicated by the decided "combination of Tup and Thold" is greater than the restriction value α or not.

When the CPU 51 makes a "YES" determination at the judgment of Step 535 (i.e., when Pacc<Pref, and "the increasing slope Gradup decided based upon the vehicle body slip angle θs">α), it proceeds to Step 540 so as to change the Tup and Thold to values Tuplim and Tholdlim that are values corresponding to the restriction value α. Specifically, the increasing slope Gradup is restricted to the restriction value α.

On the other hand, a "NO" determination is made at Step 530 or Step 535, the CPU 51 directly proceeds to Step 545 without executing the process at Step 540. These Steps 530, 535 and 540 correspond to restricting means.

Subsequently, the CPU 51 proceeds to Step 545 so as to decide the "giving pattern of the OS-suppression-control-use hydraulic pressure" from the decided support pressure Pt, value Tup and value Thold, and gives an instruction for controlling the brake hydraulic pressure control apparatus 30 such that the wheel cylinder hydraulic pressure Pw, obtained from the wheel cylinder hydraulic pressure sensor 47**, of the front wheel at the outer side of the turning locus is changed based upon the "giving pattern of the decided "OS-suppression-control-use hydraulic pressure". This Step 545 corresponds to automatic pressurization control means. It should be noted that the turning direction can be determined from the sign of the yaw rate Yr obtained from the yaw rate sensor 44**.

Then, the CPU 51 proceeds to Step 550 so as to execute the above-mentioned engine-output lowering control for lowering the output of the engine 21 on the basis of the obtained "vehicle body slip angle θ at the time of establishing the OS suppression control start condition", and then, proceeds to Step 595 to end the current execution of the present routine.

After that, since the value of the flag OS becomes "1", the CPU makes a "NO" determination when proceeding to Step 505, and then, proceeds to Step 555 so as to determine whether the OS suppression control ending condition is established or not. When a "NO" determination is made, the CPU 51 directly proceeds to Step 595 to end the current execution of the present routine.

After that, until the OS suppression control ending condition is established, the CPU 51 repeatedly executes the processes at Steps 505 and 555, and during this period, the OS suppression control and the engine-output lowering control are continued. Further, during this period, the value of the flag OS is maintained to be "1" (see the period from time t4 to time t8 in FIG. 3).

When the OS suppression control ending condition is established with this state (see time t8 in FIG. 3), the CPU 51 makes a "YES" determination when proceeding to Step 555, and then, proceeds to Step 560 so as to change the value of the flag OS to "0" from "1". Then, the CPU 51 proceeds to Step 595 to end the current execution of the present routine.

Since the value of the flag OS becomes "0" after that, the CPU 51 again makes a "YES" determination at Step 505, and it again monitors at the following Step 510 whether the OS suppression control start condition is established or not.

As explained above, the motion control apparatus according to the first embodiment of the present invention is applied to a vehicle brake apparatus provided with the hydraulic booster HB that utilizes the accumulator hydraulic pressure Pacc that is adjusted in principle to a predetermined high pressure (not less than lower limit value Pon, not more than the upper limit value Poff) by a drive control of the motor M (accordingly, the hydraulic pump HP), in order to assist the brake pedal operation by a driver.

This motion control apparatus controls plural electromagnetic solenoids (PUfr, PDfr, STR, SA1, or the like) by utilizing the accumulator hydraulic pressure Pacc in order to execute the OS suppression control that is the automatic pressurization control. The increasing slope Gradup of the brake hydraulic pressure in the OS suppression control is decided in principle based upon the vehicle motion state (specifically, the vehicle body slip angle θ). Note that, in case where the accumulator hydraulic pressure Pacc at the time of starting the OS suppression control is less than "a certain reference hydraulic pressure Pref that is slightly greater than the lower limit value (i.e., assist limit value Passist) of the accumulator hydraulic pressure Pacc required for assisting the brake operation by the hydraulic booster HB and sufficiently smaller than the lower limit value Pon", the increasing slope Gradup is restricted to the predetermined restriction value α.

With this operation, it can be secured that the accumulator Pacc always increases during the increase of the wheel cylinder hydraulic pressure Pw** by the OS suppression control, and consequently, there hardly occurs the situation in which the accumulator hydraulic pressure Pacc becomes less than the assist limit value Passist after the end of the OS suppression control. Specifically, even if a driver performs the brake pedal operation after the end of the OS suppression control, the assist force of the brake pedal operation by the hydraulic booster HB can be sufficiently secured with stability, and hence, the deceleration that is aimed by the driver with the brake operation can be secured with stability.

Second Embodiment

Subsequently explained is a vehicle brake apparatus including a vehicle motion control apparatus according to the second embodiment of the present invention. This second embodiment is different from the first embodiment in that, instead of the use of the hydraulic booster HB for assisting the brake operation by a driver by utilizing the accumulator hydraulic pressure Pacc, a brake-by-wire control is performed by utilizing the accumulator hydraulic pressure Pacc. The brake-by-wire control is for generating the wheel cylinder hydraulic pressure Pw**, on the basis of the signal outputted from brake operation signal output means that outputs a signal (electric signal) corresponding to the brake operation by a driver, corresponding to the signal (i.e., corresponding to the brake operation by the driver). Therefore, the different points will mainly be explained hereinafter. In the explanation of the second embodiment, components, variables, or the like same as or corresponding to the components, variables, or the like used in the explanation of the first embodiment are identified by the same numerals or signs used in the first embodiment.

Figure 6:
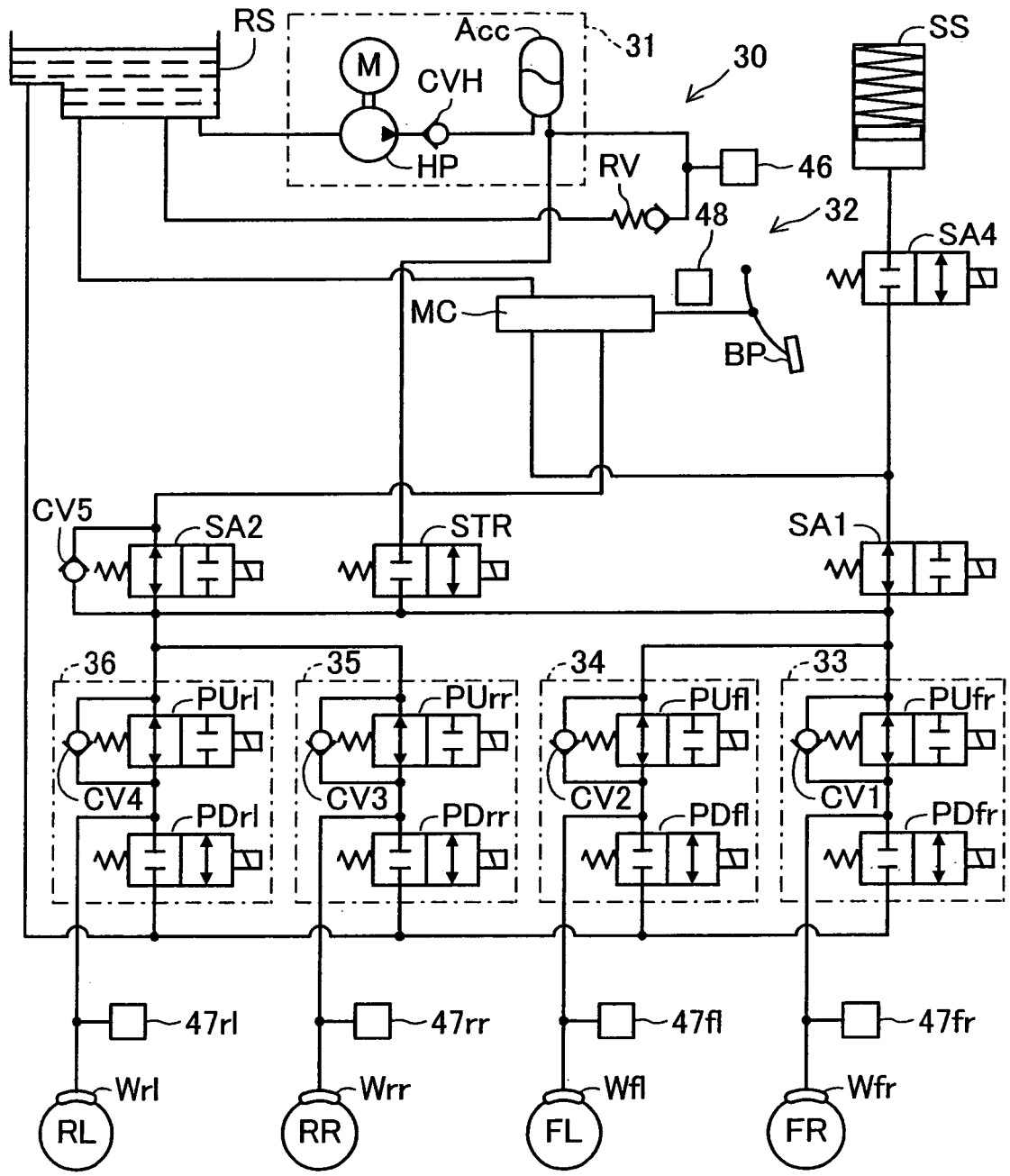
FIG. 6 is a schematic structural diagram of a brake hydraulic pressure control apparatus in a vehicle motion control apparatus according to a second embodiment of the present invention.

FIG. 6 schematically shows the structure of the brake hydraulic pressure control apparatus 30 according to the second embodiment. As apparent from the comparison to the brake hydraulic pressure control apparatus 30 according to the first embodiment, the brake hydraulic pressure control apparatus 30 according to the second embodiment is different from the brake hydraulic pressure control apparatus 30 according to the first embodiment in that the brake pedal BP is directly linked to the master cylinder MC, not through the hydraulic booster HB, the control valve SA3 is omitted, a known stroke simulator SS is provided through a control valve SA4, which is a normally-closed solenoid on-off valve of a 2-port, 2-position type, at the branch pipe branched from the pipe line linking the master cylinder MC and the control valve SA1, and a stroke sensor 48 (brake operation signal output means) is provided that detects an operation stroke of the brake pedal BP and outputs a signal indicating the operation stroke St.

The stroke simulator SS is provided as described above, so that the operation of the brake pedal BP can be secured by bringing the control valve SA4 into its excited state, in case where the control valve SA1 and the control valve SA2 (and the changeover valve STR) are in their excited state.

The brake hydraulic pressure control apparatus 30 according to the second embodiment always maintains the control valves SA1, SA2 and SA4 and the changeover valve STR into their excited state in a normal state. The brake hydraulic pressure control apparatus 30 according to the second embodiment decides the target wheel cylinder hydraulic pressure corresponding to the operation stroke St of the brake pedal BP obtained from the stroke sensor 48 (i.e., corresponding to the brake operation by a driver) based upon the operation stroke St. Then, the brake hydraulic pressure control apparatus 30 according to the second embodiment utilizes the accumulator hydraulic pressure Pacc for controlling the pressure-increasing valve PU and the pressure-reducing valve PD, whereby it controls the wheel cylinder hydraulic pressure Pw** so as to coincide with the decided target wheel cylinder hydraulic pressure.

Specifically, the brake hydraulic pressure control apparatus 30 according to the second embodiment generates the wheel cylinder hydraulic pressure Pw** corresponding to the brake operation by a driver by a so-called brake-by-wire control in the normal state.

In addition, the brake hydraulic pressure control apparatus 30 according to the second embodiment can freely and independently control the wheel cylinder hydraulic pressure Pw**, regardless of the operation stroke St of the brake pedal BP, like the brake hydraulic pressure control apparatus 30 according to the first embodiment. As a result, the brake hydraulic pressure control apparatus 30 according to the second embodiment can also achieve the automatic pressurization control (OS suppression control) same as that in the first embodiment.

On the other hand, when something abnormal occurs, the brake hydraulic pressure control apparatus 30 according to the second embodiment brings all the solenoid valves into their non-excited state. With this operation, it can generate the wheel cylinder hydraulic pressure Pw** corresponding to the operation force itself of the brake pedal BP. Therefore, a fail-safe function to the brake operation can be achieved.

Stably Ensuring Target Wheel Cylinder Hydraulic Pressure Pw by Restriction on Increasing Slope Gradup of OS-Suppression-Control-Use Hydraulic Pressure The above-mentioned brake-by-wire control cannot generate the wheel cylinder hydraulic pressure Pw exceeding the accumulator hydraulic pressure Pacc. Accordingly, supposing that the target wheel cylinder hydraulic pressure corresponding to the assumed greatest brake operation by a driver is referred to as "normal hydraulic pressure upper limit value Pupper", when the accumulator hydraulic pressure Pacc is reduced to be less than the normal hydraulic pressure upper limit value Pupper, the wheel cylinder hydraulic pressure Pw** cannot rise up to the target wheel cylinder hydraulic pressure to the operation stroke St when the brake operation close to the greatest brake operation is performed. As a result, there may occur the situation where the deceleration that is aimed by the brake operation cannot be obtained.

Notably, the normal hydraulic pressure upper limit value Pupper is sufficiently smaller than the aforesaid lower limit value Pon.

The situation where the brake operation is performed with the accumulator hydraulic pressure Pacc reduced to be less than the normal hydraulic pressure upper limit value Pupper may be produced under the condition same as the above-mentioned condition explained with reference to FIG. 3.

Figure 7:
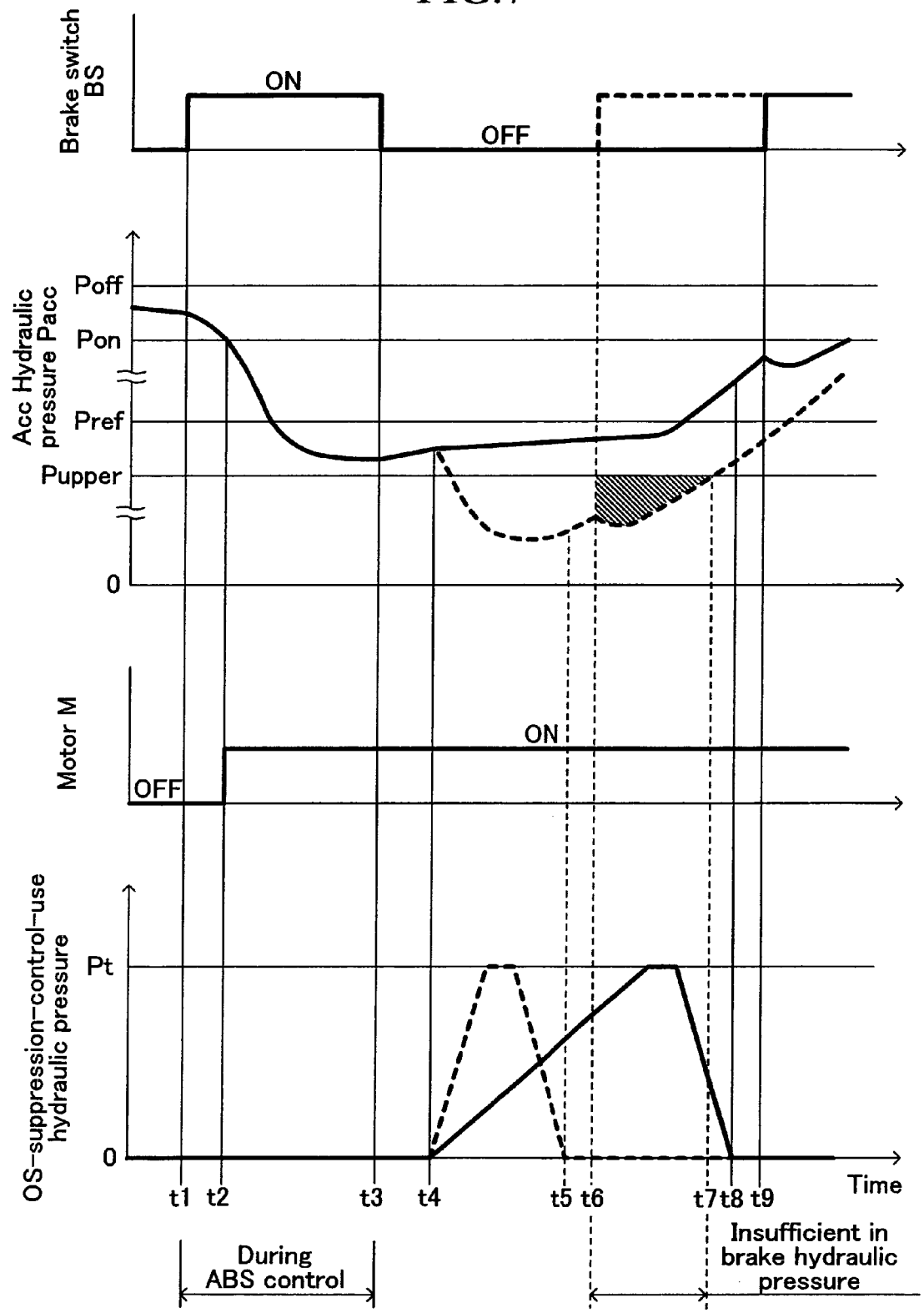
FIG. 7 is a time chart showing a change in an output from a brake switch, an accumulator hydraulic pressure, a driving state of a motor, and an over-steer-suppression-control-use hydraulic pressure, in case where the over-steer suppression control is started with the accumulator hydraulic pressure reduced due to the execution of the ABS control, and it is a time chart showing the case where the brake operation is performed with the accumulator hydraulic pressure reduced to be less than a normal hydraulic pressure upper limit value.

FIG. 7 is a time chart corresponding to FIG. 3. Times t1 to t9 (except for time t7) in FIG. 7 respectively correspond to times t1 to t9 (except for time t7) in FIG. 3. The time t7 in FIG. 7 is a time when the accumulator hydraulic pressure Pacc (see broken line), which changes below the normal hydraulic pressure upper limit value Pupper after time t4 that is the time of starting the OS suppression control having the relatively great increasing slope Gradup (see broken line), is returned to be not less than the normal hydraulic pressure upper limit value Pupper.

In this case, it is supposed that a driver performs a brake operation close to the above-mentioned greatest brake operation at time t6 that is before time t7 when the accumulator hydraulic pressure Pacc is returned to be not less than the normal hydraulic pressure upper limit value Pupper.

In this case, there may arise a problem in which the wheel cylinder hydraulic pressure Pw** cannot rise up to the target wheel cylinder hydraulic pressure to the operation stroke St (the brake hydraulic pressure is insufficient) over the period from time t6 to time t7 (see the hatched section in FIG. 7) where the accumulator hydraulic pressure Pacc is less than the normal hydraulic pressure upper limit value Pupper.

In order to prevent the problem, the increasing slope Gradup is restricted to be not more than the restriction value α in the second embodiment, like the first embodiment, in case where the accumulator hydraulic pressure Pacc at the time of starting the OS suppression control (time t4) is less than "a certain reference hydraulic pressure Pref that is slightly greater than the normal hydraulic pressure upper limit value Pupper and sufficiently smaller than the lower limit value Pon" (see FIG. 7).

Like the solid line shown in FIG. 3 after time t4, the solid line shown in FIG. 7 after time t4 indicates the "giving pattern of the OS-suppression-control-use hydraulic pressure" and the change in the accumulator hydraulic pressure Pacc after the time (time t4) of starting the OS suppression control, in case where the increasing slope Gradup is restricted to the aforesaid restriction value α. In this case, the OS suppression control is ended at time t8.

When the increasing slope Gradup is restricted to the restriction value α as described above, there never (hardly) occurs the situation in which the accumulator hydraulic pressure Pacc becomes less than the normal hydraulic pressure upper limit value Pupper after time t8 when the OS suppression control is ended. Therefore, even if a driver performs a brake operation close to the greatest brake operation at time t9 that is after the time t8 when the OS suppression control is ended, the wheel cylinder hydraulic pressure Pw can be increased up to the target wheel cylinder hydraulic pressure to the operation stroke St, and hence, the wheel cylinder hydraulic pressure Pw that is aimed for the brake operation can be secured with stability.

Actual Operation in Second Embodiment

The actual operation of the brake apparatus including the vehicle motion control apparatus according to the second embodiment of the present invention will be explained. The CPU 51 executes, as they are, the routines shown in FIGS. 4 and 5 executed by the CPU 51 in the first embodiment.

After the OS suppression control ending condition is established at step S555, the CPU 51 gives an instruction for the brake-by-wire control to the brake hydraulic pressure control apparatus 30 by the execution of the unillustrated routine (step). As a result, the control valves SA1, SA2 and SA4 and the changeover valve STR are maintained into their excited state as described above. In addition, the accumulator hydraulic pressure Pacc is utilized to control the pressure-increasing valve PU and the pressure-reducing valve PD, whereby the wheel cylinder hydraulic pressure Pw** is controlled so as to coincide with the decided target wheel cylinder hydraulic pressure corresponding to the operation stroke St.

As explained above, the vehicle motion control apparatus according to the second embodiment of the present invention is applied to a vehicle brake apparatus that utilizes the accumulator hydraulic pressure Pacc, which is in principle adjusted to be predetermined high pressure (not less than the lower limit value Pon, and not more than the upper limit value Pon) due to the drive control of the motor M (accordingly, the hydraulic pump HP), in order to perform the so-called brake-by-wire control.

Like the first embodiment, the motion control apparatus executes the OS suppression control as the automatic pressurization control. The increasing slope Gradup of the brake hydraulic pressure in the OS suppression control is decided in principle on the basis of the vehicle motion state (specifically, the vehicle body slip angle θ). Notably, the increasing slope Gradup is restricted to be not more than the predetermined restriction value α, in case where the accumulator hydraulic pressure Pacc at the time of starting the OS suppression control is less than "a certain reference hydraulic pressure Pref that is slightly greater than the upper limit value (i.e., the normal hydraulic pressure upper limit value Pupper) within the range of the wheel cylinder hydraulic pressure necessary for the execution of the brake-by-wire control and sufficiently smaller than the lower limit value Pon".

According to this, it can be secured that the accumulator hydraulic pressure Pacc always increases during when the wheel cylinder hydraulic pressure Pw increases by the OS suppression control. As a result, there hardly occurs the situation in which the accumulator hydraulic pressure Pacc becomes less than the normal hydraulic pressure upper limit value Pupper after the end of the OS suppression control. Specifically, even if a driver performs a brake pedal operation after the end of the OS suppression control, the wheel cylinder hydraulic pressure Pw that is aimed for the brake operation can be secured with stability, and consequently, the deceleration aimed by a driver with the brake operation can be secured with stability.

The present invention is not limited to the aforesaid first and second embodiments, and various modifications can be made within a scope of the present invention. For example, although the restriction value α of the increasing slope Gradup is fixed, the restriction value α may be changed according to the vehicle state (e.g., the temperature of the brake fluid that is a factor giving influence to the discharge flow rate of the brake fluid by the hydraulic pump HP, or the like). In this case, the restriction value α may be set to a greater value as the temperature of the brake fluid is high, for example.

In the first and second embodiments, the value "Tup/(Tup+Thold)" (see the equation (2)) is used as the increasing slope Gradup of the brake hydraulic pressure in the OS suppression control, since the pressure-increasing valve PU and pressure-reducing valve PD, that are on-off solenoid valves, are used as pressure-adjusting means. However, in case where the linear solenoid valve that can linearly increase the brake hydraulic pressure is used as the pressure-adjusting means, the increasing speed (increasing speed to the time) of the brake hydraulic pressure may be used as the increasing slope Gradup.

Further, in the first and second embodiments, the OS suppression control is executed as the automatic pressure means. However, other controls, such as roll-over preventing control, under-steer suppression control, adaptive cruise control, traction control, or the like, may be executed as the automatic pressurization control.

What is claimed is:

1. A vehicle motion control apparatus that is applied to a vehicle brake apparatus that comprises: a hydraulic pump; drive control means for driving the hydraulic pump; an accumulator storing brake fluid of which pressure is increased by the drive of the hydraulic pump by the drive control means; a hydraulic booster assisting a brake operation by a driver by an accumulator hydraulic pressure of the brake fluid in the accumulator; pressure-adjusting means for adjusting a wheel cylinder hydraulic pressure that is a brake hydraulic pressure in a wheel cylinder; and detecting means for detecting the accumulator hydraulic pressure, the vehicle motion control apparatus comprising: automatic pressurization control means for executing an automatic pressurization control for generating the wheel cylinder hydraulic pressure for controlling a vehicle motion independently of the brake operation by the driver by controlling the pressure-adjusting means with the use of the accumulator hydraulic pressure; and restricting means for restricting a degree of an increase in the wheel cylinder hydraulic pressure generated by the automatic pressurization control, in a case where the detected accumulator hydraulic pressure is less than a predetermined hydraulic pressure.

2. A vehicle motion control apparatus according to claim 1, wherein the drive control means is configured to drive the hydraulic pump when the detected accumulator hydraulic pressure becomes less than a predetermined lower limit value, and to stop the hydraulic pump when the accumulator hydraulic pressure exceeds a predetermined upper limit value that is greater than the lower limit value, and the restricting means is configured to use, as the predetermined hydraulic pressure, a value smaller than the lower limit value and greater than a lower limit value of the accumulator hydraulic pressure necessary for assisting the brake operation by the hydraulic booster.

3. A vehicle motion control apparatus according to claim 2, wherein the restricting means is configured to restrict the degree of the increase in the wheel cylinder hydraulic pressure generated by the automatic pressurization control such that the accumulator hydraulic pressure at least increases during when the wheel cylinder hydraulic pressure is increased by the automatic pressurization control, in a case where the detected accumulator hydraulic pressure is less than the predetermined hydraulic pressure.

4. A vehicle motion control apparatus according to claim 1, wherein the restricting means is configured to restrict an increasing slope of the wheel cylinder hydraulic pressure generated by the automatic pressurization control to be not more than a predetermined slope, in a case where the detected accumulator hydraulic pressure is less than the predetermined hydraulic pressure.

5. A vehicle motion control apparatus according to claim 4, wherein the automatic pressurization control means is configured to alternately execute a pressure-increasing control for increasing the wheel cylinder hydraulic pressure and a holding control for holding the wheel cylinder hydraulic pressure through the control of the pressure-adjusting means in a case where the wheel cylinder hydraulic pressure is increased by the automatic pressurization control, and the restricting means is configured to restrict a ratio of a time for continuing the pressure-increasing control to the sum of a time for continuing the pressure-increasing control and a time for continuing the holding control to be not more than a predetermined value.

6. A program for a vehicle motion control that is applied to a vehicle brake apparatus provided with: a hydraulic pump; drive control means for driving the hydraulic pump; an accumulator storing brake fluid of which pressure is increased by the drive of the hydraulic pump by the drive control means; a hydraulic booster assisting a brake operation by a driver by an accumulator hydraulic pressure of the brake fluid in the accumulator; pressure-adjusting means for adjusting a wheel cylinder hydraulic pressure that is a brake hydraulic pressure in a wheel cylinder; and detecting means for detecting the accumulator hydraulic pressure, this program comprising: an automatic pressurization control step executing an automatic pressurization control for generating the wheel cylinder hydraulic pressure for controlling a vehicle motion independently of the brake operation by the driver by controlling the pressure-adjusting means with the use of the accumulator hydraulic pressure; and a restricting step restricting a degree of an increase in the wheel cylinder hydraulic pressure generated by the automatic pressurization control, in a case where the detected accumulator hydraulic pressure is less than a predetermined hydraulic pressure.

7. A vehicle motion control apparatus is applied to a vehicle brake apparatus that comprises: an accumulator storing brake fluid of which pressure is generated by a hydraulic pump; a hydraulic booster assisting a brake operation by a driver by means of a first hydraulic pressure of the brake fluid in the accumulator; and pressure-adjusting means for adjusting a second hydraulic pressure of the brake fluid in a wheel cylinder, the second hydraulic pressure being generated by the first hydraulic pressure, the vehicle motion control apparatus comprising: automatic pressurization control means for controlling the second hydraulic pressure in the wheel cylinder for a vehicle motion control independently of the brake operation by the driver via the pressure-adjusting means; and restricting means for restricting an increase degree of the second hydraulic pressure in the wheel cylinder controlled by the automatic pressurization control means when the first hydraulic pressure in the accumulator is less than a predetermined hydraulic pressure.

* * * * *